United States Patent [19]

Hodgson

[11] 4,049,778

[45] Sept. 20, 1977

[54] PARTICULATE AMMONIUM NITRATE WITH ADDED FERRIC PHOSPHATE AND CALCIUM SULFATE

[75] Inventor: Clive Hodgson, Forest Knolls, Calif.

[73] Assignee: Chevron Research Company, San Francisco, Calif.

[21] Appl. No.: 356,886

[22] Filed: May 3, 1973

Related U.S. Application Data

[63] Continuation-in-part of Ser. No. 107,426, Jan. 18, 1971, abandoned.

[51] Int. Cl.² .............................................. C01C 1/18
[52] U.S. Cl. ..................................... 423/265; 55/64; 423/267; 423/396
[58] Field of Search ............... 423/265, 266, 267, 396, 423/517; 71/1, 59, 64, 39; 23/293 A, 300, 302

[56] References Cited

U.S. PATENT DOCUMENTS

| | | | |
|---|---|---|---|
| 3,021,207 | 2/1962 | Stengel | 71/59 X |
| 3,148,945 | 9/1964 | Griffith | 423/267 |
| 3,148,946 | 9/1964 | Griffith | 423/266 |
| 3,244,500 | 4/1966 | Stinson et al. | 71/1 |
| 3,582,313 | 6/1971 | Strelzoff et al. | 423/396 X |
| 3,679,377 | 7/1972 | Young | 423/517 |

*Primary Examiner*—G. O. Peters
*Attorney, Agent, or Firm*—Dix A. Newell; John Stoner, Jr.; Raymond Owyang

[57] ABSTRACT

Improved-strength particulate ammonium nitrate containing minor amounts of ferric phosphate is produced by forming the ferric phosphate in situ in aqueous or molten ammonium nitrate from a ferric salt and phosphoric acid. Further improvement in strength is obtained by additionally incorporating minor amounts of calcium sulfate.

12 Claims, No Drawings

PARTICULATE AMMONIUM NITRATE WITH ADDED FERRIC PHOSPHATE AND CALCIUM SULFATE

CROSS-REFERENCE TO RELATED APPLICATION

This application is a continuation-in-part of application Ser. No. 107,426, filed Jan. 18, 1971, now abandoned.

BACKGROUND OF THE INVENTION

1. Field

The present invention relates to a novel composition of matter. In particular, the composition of matter comprises particulate ammonium nitrate having admixed therewith ferric phosphate in an amount of from 0.1 to 2.5 weight percent, and, optionally, calcium sulfate in an amount of from 0.1 to 2.5 weight percent.

2. Prior Art

Solid particulate ammonium nitrate, i.e., prills or granules, during normal production and/or subsequent handling often break with the formation of fines or dust. The presence of fines or dust during these operations makes the product more difficult to handle and increases the problems of both the manufacturer and the user. Several additives have been suggested to reduce the problem of particulate ammonium nitrate breakage. Thus, the natural phosphates, potassium metaphosphate, ammonium sulfate, potassium chloride, magnesium salts, etc., have been suggested. U.S. Pat. No. 3,317,276, as an example, discloses the use of boric acid or a salt thereof to increase the physical stability of ammonium nitrate. This patent also refers to several other patents as well as a variety of additives suggested for increasing the physical stability of ammonium nitrate. See also U.S. Pat. No. 3,148,946, which discloses the use of ferrous sulfate to improve the dimensional stability of ammonium nitrate.

SUMMARY OF THE INVENTION

It has now been found that solid particulate ammonium nitrate has increased strength if it has admixed therewith from 0.1 to 2.5 weight percent ferric phosphate. Furthermore, solid particulate ammonium nitrate has increased strength if it has admixed therewith from 0.1 to 2.5 weight percent ferric phosphate and from 0.1 to 2.5 weight percent calcium sulfate. The particles find particular use as fertilizers.

DESCRIPTION OF THE INVENTION

As used herein, particulate ammonium nitrate means ammonium nitrate in the form of separate discrete macroparticles, i.e., prills or granules, as opposed to powdered ammonium nitrate or solutions thereof. The preferred particulate ammonium nitrate for purposes of the present invention is ammonium nitrate in the form of prills because of the inherently weaker structure of the hollow prills. Particulate ammonium nitrate will generally be macroparticles of at least 20 Tyler mesh or greater, i.e., the macroparticles will not pass through a 20 Tyler mesh screen. Fines and dust refer to the very small particles of ammonium nitrate which will pass through a 20 Tyler mesh, 30 Tyler mesh, etc., screen. Furthermore, the present invention is preferably directed to compositions consisting essentially of (1) ammonium nitrate and ferric phosphate, or (2) ammonium nitrate, ferric phosphate and calcium sulfate.

Prills are generally made by spraying molten, essentially anhydrous ammonium nitrate into the top of a prilling tower. In this tower small droplets of ammonium nitrate pass countercurrently through a rising stream of cooling air and in this way solidify into prills. After reading the bottom of the tower, the prills are passed through a rotary drying drum to remove moisture, through a cooler, then through a coating drum where the prills are coated with a thin layer of an inert solid material such as diatomaceous earth, and finally into a bulk storage building.

Granules of ammonium nitrate are made by drying an aqueous ammonium nitrate solution in a rotating drum granulator. When dried, the granules are then cooled, coated and placed in bulk storage, as were the prills.

Since the prills and granules must be transported from one location to another as, for example, during bagging or bulk shipment process, these prills and granules are subjected to severe bumps, collisions, grindings, etc., both with the walls of the equipment and with one another. The result is the breaking of some prills and the formation of fines. The presence of fines particularly increases the difficulty of handling.

Solid particulate ammonium nitrate containing 0.1 to 2.5 weight percent, preferably 0.3 to 2 weight percent, ferric phosphte, is significantly stronger than the corresponding solid particulate ammonium nitrate not having this additive. Solid particulate ammonium nitrate containing ferric phosphate shows greatly reduced quantities of fines upon handling. Furthermore, solid particulate ammonium nitrate containing 0.2 to 5 weight percent, preferably 0.2 to 4 weight percent, of a combination of ferric phosphate and calcium sulfate in a mol ratio of 5:1 to 1:5, preferably 2:1 to 1:2, of ferric phosphate to calcium sulfate, shows significantly greater strength, e.g., as measured by resistance to fines or dust production, than particulate ammonium nitrate without an additive or particulate ammonium nitrate containing only ferric phosphate. Preferably, when both ferric phosphate and calcium sulfate are present, the amount of ferric phosphate will be from 0.1 to 2.5 weight percent, preferably from 0.1 to 2 weight percent, and the amount of calcium sulfate will be from 0.1 to 2.5 weight percent, preferably from 0.1 to 1.5 weight percent.

The ferric phosphate is incorporated in the ammonium nitrate by an "in situ" formation of ferric phosphate. That is, ferric phosphate is formed in the ammonium nitrate by adding a soluble ferric salt, such as ferric nitrate, ferric sulfate, etc., and phosphoric acid to the ammonium nitrate. Generally, substantially stoichiometric amounts of the ferric ion and the phosphoric acid will be added. Phosphoric acid may also be formed in situ by adding a phosphate salt and an acid, preferably nitric acid, and digesting for about 15 to 20 minutes. The soluble ferric salt can be added first and the phosphate second, or vice versa. The resulting mixture will then be neutralized, e.g., with ammonia, to a pH of 6-7 prior to prill or granule formation.

Soluble ferrous salts, such as ferrous sulfate, may also be used as a source of iron for the in situ formation of ferric phosphate. In this method the ferrous salt is added to the ammonium nitrate and is then oxidized to ferric iron. This oxidation may be accomplished in several ways; for example, by heating the resulting mixture in air at a pH of 6-7 for a period of time of about 5 to 30 minutes or alternately by acidifying the ammonium nitrate-ferrous salt mixture with nitric acid or other oxidizing agent to a pH of about 1 and then heating for the period of time of about 5 to 30 minutes. Following the oxidation of the ferrous to ferric, the phosphate salt or phosphoric acid is added and the mixture processed as before.

For compositions which contain calcium sulfate in addition to ferric phosphate, the calcium sulfate is also formed in situ by adding calcium carbonate to the reaction mixture after the addition of ferric sulfate and phosphoric acid, but before final neutralization at a pH of 6–7. If ferric sulfate is not used, then another sulfate such as ammonium sulfate can be added.

A preferred process for making the strong ammonium nitrate prills and granules of the present invention involves the digestion of phosphate rock (essentially tribasic calcium phosphate) with hot concentrated nitric acid until most of the phosphate is dissolved. The digestion mixture is then added to a solution containing ammonium nitrate and ferric sulfate, which solution is then neutralized to a pH of 6–7 by ammonia. Said solution can be prepared from ferric sulfate or preferably from ferrous sulfate. In the latter process, the ferrous sulfate is added to an ammonium nitrate solution at a pH of 6–7, which is heated in air at around 100° C. for 5–30 minutes prior to mixing with the digestion mixture.

Following the admixture of the ferric phosphate or ferric phosphate/calcium sulfate with ammonium nitrate, prills or granules can then be formed by conventional means.

The following examples illustrate the improved strength properties of solid particulate ammonium nitrate containing the additives of this invention.

EXAMPLES

EXAMPLE 1

600 grams of ammonium nitrate were stirred with 100 ml water and heated to 100° C. A 2.5 g sample of hydrated ferric phosphate (33.4% Fe) was mixed into the resulting solution. The solution was then heated slowly at about 2° C. per minute until the temperature reached 180° C. Anhydrous ammonia was then sparged through the solution to maintain the pH between 6 and 7, and heating was continued until the temperature reached 240° C. At this temperature, the water content of the system had been reduced below 0.25% by weight. The essentially anhydrous melt was next prilled into silicone oil, forming prills of which most were in the size range −6+12 Tyler mesh. The prills were then separated from the silicone oil, washed with normal hexane in Soxhlet extractors for one hour, and dried in a laboratory oven at 80° C. for 1 hour. Only about 0.1% silicone oil remained on the prills after this step. It has been found that prills formed in this way are essentially equivalent to prills formed in a commercial drying tower.

The prills were screened to −6+12 Tyler mesh before undergoing testing of their physical properties. The prills contained 0.38% by weight of ferric phosphate.

EXAMPLE 2

The procedure of Example 1 was followed, except that 6.06 g of ferric nitrate nonahydrate and 1.70 g of 86% phosphoric acid were mixed into the solution at 100° C. The ferric nitrate was added as a hot 20% solution. The resulting product contained 0.38% by weight of ferric phosphate formed in situ.

EXAMPLE 3

The procedure of Example 1 was followed, except that at 100° C., 7.95 g ferric phosphate hydrate, containing 28% Fe, was added. The resulting product contained 1.0% by weight of ferric phosphate.

EXAMPLE 4

The procedure of Example 1 was followed, except that at 100° C., 16.0 g of ferric nitrate nonahydrate was added as a 20% solution, followed by 4.87 g of 80% phosphoric acid. The resulting product contained 1.0% ferric phosphate precipitated in situ.

EXAMPLE 5

The procedure of Example 1 was followed, except that 15.9 g of hydrated ferric phosphate (28.0% Fe) was mixed into the solution. The resulting product contained 2.0% by weight of ferric phosphate.

EXAMPLE 6

The procedure of Example 1 was followed, except that 32.0 g of ferric nitrate nonahydrate and 9.63 g of 80% phosphoric acid were mixed into the solution at 100° C. The ferric nitrate was added as a hot 20% solution. The resulting product contained 2.0% by weight of ferric phosphate formed in situ.

EXAMPLE 7

The procedure of Example 1 was followed, except that at 100° C., 0.795 g of hydrated ferric phosphate, containing 28% Fe, was added. At 170° C., 0.683 g of calcium sulfate dihydrate was added also. The resulting product contained 0.1% ferric phosphate and 0.09% calcium sulfate.

EXAMPLE 8

The procedure of Example 1 was followed, except that at 100° C. a mixture was added consisting of 1.0 g of Western Phosphate Rock and 1.105 g of ferrous sulfate heptahydrate digested in 30 mil of nitric acid (57%) for one-half hour. The resulting product contained 0.1% ferric phosphate and 0.09% calcium sulfate precipitated in situ.

EXAMPLE 9

The procedure of Example 1 was followed, except that 2.50 g of hydrated ferric phosphate and 3.0 g of ammonium sulfate were mixed into the solution at 100° C. At 170° C., 1.02 g of calcium carbonate was added also. The resulting product contained 0.38% by weight ferric phosphate and 0.23% by weight calcium sulfate.

EXAMPLE 10

The procedure of Example 1 was followed, except that 3.0 g of ferric sulfate and 1.56 g of 86% phosphoric acid were mixed into the solution at 100° C. The ferric sulfate was added as a 20% solution. Also, at 170° C., 1.02 g of calcium carbonate was added. The resulting product contained 0.38% by weight ferric phosphate and 0.23% calcium sulfate formed in situ.

EXAMPLE 11

The procedure of Example 1 was followed, except that 15.9 g of hydrated ferric phosphate and 15.0 g of ammonium sulfate were mixed into the solution at 100° C. At 170° C., 5.0 g of calcium carbonate was also added. The resulting product contained 2.0% by weight ferric phosphate and 1.13% by weight calcium sulfate.

EXAMPLE 12

The procedure of Example 1 was followed, except that 32.0 g of ferric nitrate nonahydrate and 9.63 g of 80% phosphoric acid were mixed into the solution at 100° C. The ferric sulfate was added as a 20% solution. Also, at 170° C., 5.0 g of calcium carbonate was added. The resulting product contained 2.0% by weight ferric phosphate and 1.13% calcium sulfate formed in situ.

The ammonium nitrate prills prepared in Examples 1–12 were subjected to the following tests of their physical properties:

Hardness

Hardness was measured directly by the force required in pounds to disintegrate single prills having a size of −8+10 Tyler mesh. The hardness tester was the Chatillon Model DPP10. An average breaking strength of 25 prills was taken as the measure of prill hardness.

Pneumatic Breakdown

This test followed closely that described by Miller and Saeman, Ind. Eng. Chem. 40, 159 (1948). A representative sample of the prills of −6+12 Tyler mesh, about 50 g by weight, was fed into a high-velocity air stream and propelled against a metal plate. The shattered prills were then collected, and the weight percent of −20 Tyler mesh particles was reported as a measure of the pneumatic breakdown.

The results of these tests are given in Table I.

TABLE I

Effect of In Situ Incorporation of Ferric Phosphate and Calcium Sulfate on the Strength Properties of Ammonium Nitrate Prills

| Ex. No. | Method | FePO$_4$ Wt.% | CaSO$_4$ Wt.% | Hardness, lbs. | Pneumatic Breakdown, % (−20 mesh) |
|---|---|---|---|---|---|
| 1 | Mech. | 0.38 | 0 | 2.8 | 38.3 |
| 2 | In situ | 0.38 | 0 | 3.5 | 31.9 |
| 3 | Mech. | 1.0 | 0 | 3.0 | 37.5 |
| 4 | In situ | 1.0 | 0 | 3.9 | 32.9 |
| 5 | Mech. | 2.0 | 0 | 3.1 | 35.5 |
| 6 | In situ | 2.0 | 0 | 4.7 | 37.8 |
| 7 | Mech. | 0.1 | 0.09 | 2.8 | 24.9 |
| 8 | In situ | 0.1 | 0.09 | 3.3 | 30.3 |
| 9 | Mech. | 0.38 | 0.23 | 3.5 | 31.1 |
| 10 | In situ | 0.38 | 0.23 | 5.0 | 28.8 |
| 11 | Mech. | 2.0 | 1.13 | 4.2 | 19.9 |
| 12 | In situ | 2.0 | 1.13 | 5.8 | 8.4 |

EXAMPLES 13–16

Other samples of ammonium nitrate containing various quantities of ferric phosphate and calcium sulfate were also prepared by the procedure of Example 10. The ferric phosphate and calcium sulfate contents of these samples are shown in Table II.

TABLE II

Effect of Ferric Phosphate and Calcium Sulfate on the Strength Properties of Ammonium Nitrate Prills

| Ex. No. | FePO$_4$ Wt.% | CaSO$_4$ Wt.% | Hardness, lbs. | Pneumatic Breakdown, % (−20 mesh) |
|---|---|---|---|---|
| 13 | 0.76 | 0.40 | 5.5 | 20.0 |
| 14 | 0.56 | 0.30 | 4.4 | 25.0 |
| 15 | 0.19 | 0.10 | 3.7 | 44.8 |
| 16 | 0.20 | 0.45 | 3.9 | 20.5 |

EXAMPLE 17

Preparation of Ferric Phosphate/Calcium Sulfate-Containing Ammonium Nitrate Prills from Phosphate Rock and Ferric Sulfate The procedure of Example 8 was followed, except that at 100° C. a mixture, formed by digesting 30 ml 57% nitric acid, 3.9 g of Western Phosphate Rock, and 3.0 g of ferric sulfate for 2 hours at 70° C., was added. This product contained 0.38% ferric phosphate and 0.51% calcium sulfate.

EXAMPLE 18

Preparation of Ferric Phosphate/Calcium Sulfate-Containing Ammonium Nitrate Prills from Phosphate Rock and Ferrous Sulfate The procedure of Example 8 was followed, except that at 100° C., 4.18 g of ferrous sulfate heptahydrate was added as a 20% solution, and stirring continued gently for 10 minutes at a pH of 6 to 7. Next, the solution was brought to a pH of 1.0 using concentrated nitric acid; and to it was added a slurry of 3.9 g Phosphate Rock and 30 ml of 57% nitric acid, which had been digested for 30 minutes at a temperature of 60° to 110° C. Heating was continued to 180° C., as in Example 8, when ammoniation was begun. This product contained 0.38% ferric phosphate and 0.34% calcium sulfate.

The physical properties of samples made according to Examples 17 and 18 are given in Table III.

TABLE III

Physical Properties of Ammonium Nitrate Prills Made with Phosphate Rock and Ferrous or Ferric Sulfate

| Ex. No. | Iron Source | FePO$_4$ Wt.% | CaSO$_4$ Wt.% | Hardness, lbs. | Pneumatic Breakdown, % (−20 mesh) |
|---|---|---|---|---|---|
| 17 | Ferric Sulfate | 0.38 | 0.51 | 4.8 | 28.7 |
| 18 | Ferrous Sulfate | 0.38 | 0.68 | 4.3 | 25.2 |

As before, it can be seen that these prills, made from Phosphate Rock and containing ferric phosphate and calcium sulfate, also have a greatly enhanced hardness and resistance to pneumatic breakdown.

EXAMPLE 19

Preparation of Ammonium Nitrate Prills Without Additives 600 g of ammonium nitrate was stirred with 100 ml of water and heated to 100° C. The solution which formed at this temperature was heated slowly at about 2° C. per minute until the temperature reached 180° C. Anhydrous ammonia was then sparged through the solution to maintain the pH between 6 and 7, and heating was continued until the temperature reached 240° C. At this temperature, the water content of the system had been reduced below 0.25% by weight. The essentially anhydrous melt was next prilled into silicone oil, forming prills of which most were in the size range −6+12 Tyler mesh. The prills were then separated from the silicone oil, washed with normal hexane in Soxhlet extractors for 1 hour, and dried in a laboratory oven at 80° C. for 1 hour. Only about 0.1% silicone oil remained on the prills after this step. The prills were screened to −6+12 Tyler mesh before undergoing testing of their physical properties. The prill hardness was 2.5 pounds and pneumatic breakdown (−20 mesh) was 56.2%.

As will be evident to those skilled in the art, various modifications of this invention can be made or followed in the light of the foregoing disclosure and discussion without departing from the spirit or scope of the disclosure or from the scope of the following claims.

What is claimed is:

1. A composition of matter comprising solid particulate ammonium nitrate prepared in situ by mixing with aqueous or molten ammonium nitrate sufficient soluble ferric salt and phosphoric acid in substantially stoichiometric amounts adapted to form ferric phosphate in an amount from 0.3 to 2 weight percent, based on weight of ammonium nitrate, and subsequently prilling or granulating the ammonium nitrate.

2. The composition of claim 1 wherein the ferric salt is ferric nitrate or sulfate.

3. The composition of claim 1 wherein said phosphoric acid is formed in situ by adding a phosphate salt and an acid and digesting for sufficient time to form said phosphoric acid.

4. The composition of claim 1 wherein said ferric salt is formed by oxidizing ferrous sulfate in situ.

5. The composition of claim 1 wherein the solid particulate ammonium nitrate comprises macroparticles of greater than 20 Tyler mesh.

6. A composition of matter comprising solid particulate ammonium nitrate containing a mixture of 0.1 to 2.5 weight percent, based on weight of ammonium nitrate, of ferric phosphate and 0.1 to 2.5 weight percent, based on weight of ammonium nitrate, of calcium sulfate, in a mol ratio of ferric phosphate to calcium sulfate of 5:1 to 1:5, said composition being prepared in situ by mixing aqueous or molten ammonium nitrate with (1) a soluble ferric salt, ammonium sulfate and phosphoric acid in substantially stoichiometric amounts or (2) ferric sulfate and phosphoric acid in substantially stoichiometric amounts, and subsequently adding calcium carbonate to the resulting composition.

7. The composition of claim 6 wherein the amount of ferric phosphate is from 0.1 to 1.5 weight percent, the amount of calcium sulfate is from 0.1 to 1.5 weight percent and the mol ratio of ferric phosphate to calcium sulfate is 2:1 to 1:2.

8. The composition of claim 6 wherein the ferric salt is ferric nitrate or sulfate.

9. The composition of claim 6 wherein said phosphoric acid is formed in situ by adding a phosphate salt and an acid and digesting for sufficient time to form said phosphoric acid.

10. The composition of claim 6 wherein said ferric salt is formed by oxidizing a ferrous salt in situ.

11. The composition of claim 6 wherein the solid particulate ammonium nitrate comprises macroparticles of greater than 20 Tyler mesh.

12. The composition of claim 6 wherein said solid particulate ammonium nitrate comprises prills or granules.

* * * * *